(12) United States Patent
Claus et al.

(10) Patent No.: US 8,340,373 B2
(45) Date of Patent: Dec. 25, 2012

(54) QUANTITATIVE IMAGE RECONSTRUCTION METHOD AND SYSTEM

(75) Inventors: Bernhard Erich Hermann Claus, Niskayuna, NY (US); John Patrick Kaufhold, Arlington, VA (US)

(73) Assignee: General Electric Company, Niskayuna, NY (US)

( * ) Notice: Subject to any disclaimer, the term of this patent is extended or adjusted under 35 U.S.C. 154(b) by 1612 days.

(21) Appl. No.: 11/805,369

(22) Filed: May 23, 2007

(65) Prior Publication Data

US 2008/0292217 A1 Nov. 27, 2008
US 2011/0293200 A9 Dec. 1, 2011

Related U.S. Application Data

(63) Continuation-in-part of application No. 10/744,882, filed on Dec. 23, 2003, now Pat. No. 7,653,229.

(51) Int. Cl.
*G06K 9/00* (2006.01)
*G01N 23/00* (2006.01)

(52) U.S. Cl. .............................. 382/128; 382/131; 378/4
(58) Field of Classification Search .................. 382/131, 382/133, 154, 128, 173; 378/4, 21
See application file for complete search history.

(56) References Cited

U.S. PATENT DOCUMENTS

| | | | | |
|---|---|---|---|---|
| 4,835,712 A | * | 5/1989 | Drebin et al. | 345/423 |
| 5,361,763 A | * | 11/1994 | Kao et al. | 600/410 |
| 5,588,032 A | | 12/1996 | Johnson et al. | |
| 5,872,828 A | | 2/1999 | Niklason | |
| 6,632,020 B2 | | 10/2003 | Kaufhold | |
| 6,658,080 B1 | * | 12/2003 | Poole et al. | 378/4 |
| 6,674,835 B2 | | 1/2004 | Kaufhold | |
| 6,754,298 B2 | | 6/2004 | Fessler | |
| 2005/0135664 A1 | * | 6/2005 | Kaufhold et al. | 382/131 |

OTHER PUBLICATIONS

John P. Kaufhold, Energy Formulations of Medical Image Segmentations, Aug. 11, 2000, Boston University College of Engineering Department of Biomedical Engineering Doctoral Thesis.

* cited by examiner

*Primary Examiner* — Jon Chang
(74) *Attorney, Agent, or Firm* — Fletcher Yoder

(57) ABSTRACT

A technique is provided for generating quantitative projection images from projection images. The pixels of the quantitative projection images correspond to quantitative composition estimates of two or more materials. The quantitative projection images are reconstructed to generate a quantitative volume in which each voxel value corresponds quantitatively to the two or more materials or a mixture of the two or more materials.

20 Claims, 7 Drawing Sheets

QUANTITATIVE IMAGE RECONSTRUCTION METHOD AND SYSTEM

CROSS-REFERENCE TO RELATED APPLICATIONS

This application is a continuation-in-part of U.S. patent application Ser. No. 10/744,882, filed Dec. 23, 2003, now U.S. Pat. No. 7,653,229, which is herein incorporated by reference in its entirety for all purposes.

STATEMENT REGARDING FEDERALLY SPONSORED RESEARCH & DEVELOPMENT

This invention was made with Government support under contract number MDA905-00-1-0041 awarded by Office of Naval Research. The Government has certain rights in the invention.

BACKGROUND

The invention relates generally to the field of non-invasive imaging and, more particularly, to the field of processing and reconstruction of volumes based on non-invasively acquired images.

Non-invasive imaging techniques may be useful in a variety of contexts. For example, in package and passenger screening contexts, non-invasive imaging techniques allow a passenger or package to be evaluated for contraband or other illicit materials or items rapidly and with no or minimal contact. Likewise, in industrial settings, non-invasive imaging techniques allow manufactured parts or components to be checked for manufacturing defects or damage due to wear and tear which might otherwise be undetectable. For example, minute fissures or cracks may be detected within a component without having to destroy or deconstruct the component.

Perhaps the most prevalent or well-known application of non-invasive imaging however is in the medical context. For example, X-ray based techniques for obtaining images of bones or other internal structures of a patient are generally well known. Such techniques may have their limitations, however. For example, two-dimensional X-ray images, or radiographs, allow separate and distinct structures to be superimposed on one another, thereby allowing features of interest to be hidden behind otherwise uninteresting structures or allowing two or more otherwise uninteresting features to be mistaken for a feature of interest.

Further, there is no absolute scale for the intensity values, typically gray-scale values, within an image. As a result, a radiologist must typically rely on his or her experience and subjective judgment for interpretation of the image and to attribute image content to locally varying composition and/or thickness of the imaged object. In other words, the radiologist must use his or her subjective judgment and experiences to interpret the qualitatively different "light" and "dark" regions of an image into meaningful anatomical data. Such subjective determinations may be further complicated because the appearance of the image may depend on the X-ray technique used during image acquisition.

The advent of three-dimensional imaging techniques address some, but not all, of the issues related to two-dimensional images techniques noted above. For example, in tomosynthesis a limited number of radiographs acquired at different "view angles" along a limited angular range are used to reconstruct a three-dimensional volume. Such a reconstructed volume can address issues related to interpreting overlapping tissue and the resulting superimposition noted above. However, in tomosynthesis and other similar three-dimensional imaging techniques there is still no absolute quantitative relationship between voxel intensities and the material or tissue composition they represent. As a result, the interpretation of reconstructed volumes remains a subjective endeavor that relies largely on the experience and background of the reviewing radiologist or clinician. Furthermore, because the reconstructed volumes are largely dependent on the technique used to acquire the images used to reconstruct the volume, as well as on the reconstruction algorithm employed and other factors, it is difficult to compare volumes reconstructed from images acquired using different techniques or acquired at different times.

BRIEF DESCRIPTION

The present techniques are generally directed to the generation of quantitative volumes comprised of voxels having values which correspond quantitatively to two or more materials or a mixture of the two or more materials. The quantitative volume is reconstructed from a plurality of quantitative projection images having pixels that correspond to a quantitative composition estimate of the two or more materials. In one embodiment, the quantitative projection images are generated from respective projection images using suitable calibration information. Furthermore, in certain embodiments, the quantitative volume so generated is constrained, such as to a number of values corresponding to the number of different materials being imaged and their respective X-ray attenuation coefficients. In addition, in some embodiments, iterative processing may be employed to further improve the consistency of the quantitative volume to original or reference projection images.

With this in mind, in one embodiment a method for generating a volume is provided. The method includes the act of providing a plurality of projection images. A plurality of respective quantitative projection images is generated based on the plurality of projection images. The quantitative projection images comprise a plurality of pixels that each correspond to a quantitative composition estimate representing a combination of two or more materials. The plurality of quantitative projection images is reconstructed to generate a quantitative volume comprising a plurality of voxels. Each voxel value corresponds quantitatively to one of the two or more materials or a mixture of the two or more materials.

In a further embodiment, an image processing system is provided. The system includes processing circuitry configured to generate a plurality of quantitative projection images based on a plurality of respective projection images. The quantitative projection images comprise a plurality of pixels that each represent a quantitative composition estimate of two or more materials. The processing circuitry is also configured to reconstruct the plurality of quantitative projection images to generate a quantitative volume comprising a plurality of voxels. Each voxel value corresponds quantitatively to one of the two or more materials or a mixture of the two or more materials.

In an additional embodiment, one or more tangible, machine readable media are provided. The one or more tangible, machine readable media include a routine configured to generate a plurality of respective quantitative projection images based on a plurality of projection images. The quantitative projection images comprise a plurality of pixels that each correspond to a quantitative composition estimate representing a combination of two or more materials. The one or more tangible, machine readable media also include a routine configured to reconstruct the plurality of quantitative projection images to generate a quantitative volume comprising a plurality of voxels. Each voxel value corresponds quantitatively to one of the two or more materials or a mixture of the two or more materials

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present technique is generally directed towards tomosynthesis imaging techniques to generate useful images for medical and non-medical applications. As will be appreciated by those of ordinary skill in the art, the present techniques may be applied in various medical and non-medical applications, such as passenger and/or baggage screening, to provide useful three-dimensional data and context. To facilitate explanation of the present techniques, however, a medical implementation will be generally discussed herein, though it is to be understood that non-medical implementations are also within the scope of the present techniques.

Tomosynthesis imaging utilizes a limited number of projection images that are acquired over a limited angular range, generally less than 180 degrees, relative to an object or a patient. The projection images are combined and reconstructed to generate three-dimensional images of all or part of the object or patient. For example, the projection images may be generated using an X-ray source moving relative to a subject undergoing imaging such that images of the subject are acquired at different view angles or locations. The different view angles from which the projections are acquired provide the desired three-dimensional information when combined and reconstructed.

Figure 1:
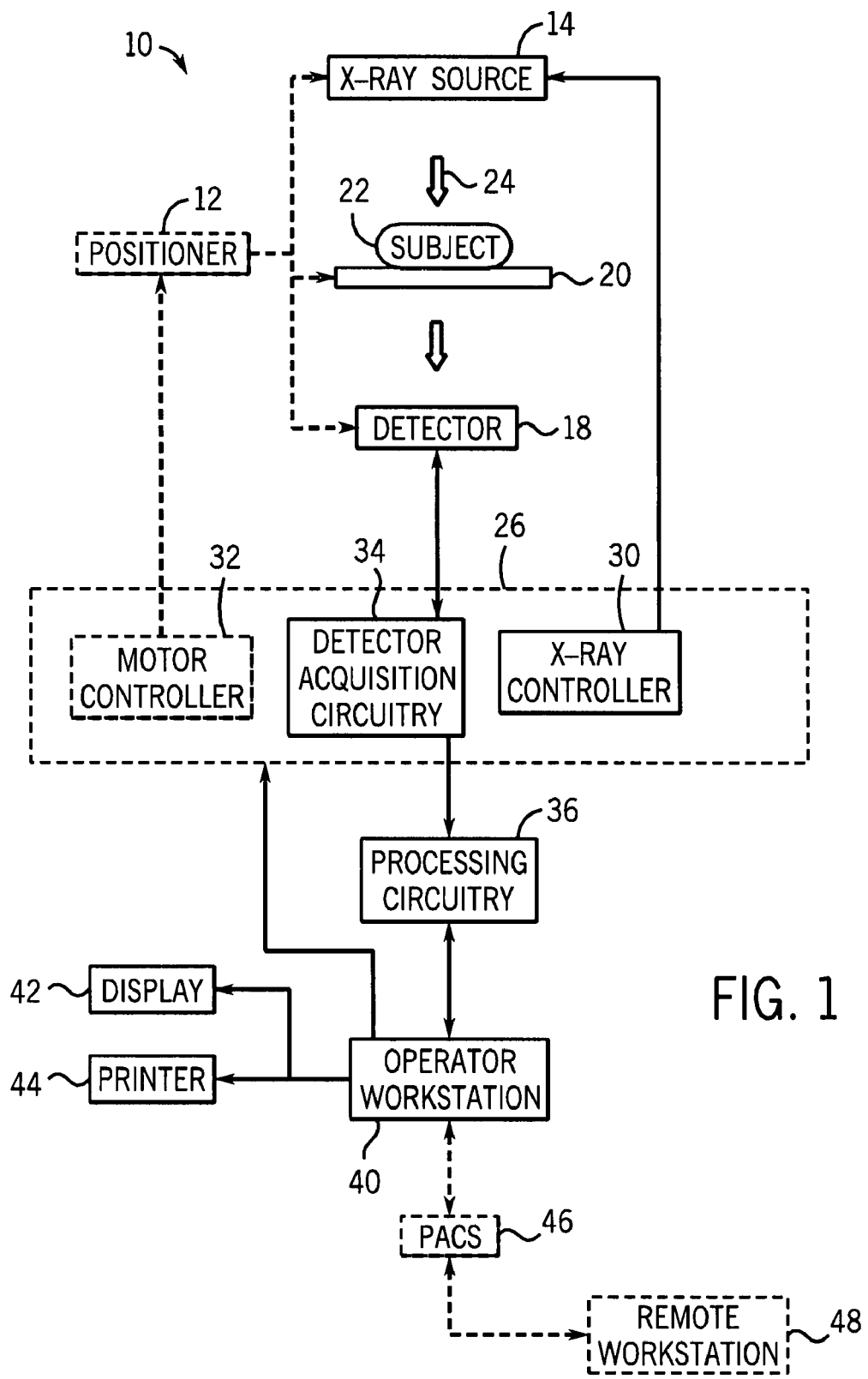
FIG. 1 depicts an exemplary embodiment of a tomosynthesis system, in accordance with the aspects of present technique.

Turning now to the drawings, and referring first to FIG. 1, an exemplary embodiment of a tomosynthesis system 10 for use in accordance with the present technique is illustrated diagrammatically. As depicted, the tomosynthesis system 10 includes a positioner 12 that supports an X-ray source 14. A digital detector 18, such as a flat panel detector, is generally situated across the imaging volume from the X-ray source 14. The digital detector 18 may be stationary or may move in coordination with or independent from the X-ray source 14. For example, the detector 18 may also be attached to the positioner 12 such that the X-ray source 14 and detector 18 remain in fixed alignment or the positioner 12 may accommodate differential movement of the X-ray source 14 and the detector 18. Alternatively, instead of or in addition to moving the X-ray source 12 and/or the detector 18, the positioner 12 may move a support 20 on which the subject 22 undergoing imaging rests. For example, in such an embodiment, the positioner 12 may be physically attached to a support 20 or table configured to be rotated and/or translated while supporting the subject 22.

By way of example, in some embodiments the positioner 12 may be a C-arm or a pivoting arm to which the X-ray source 14 or the X-ray source 14 and the digital detector 18 are physically attached. In general, the positioner 12 provides the physical motion of the X-ray source 14, the digital detector 18, and/or the support 20 in accordance with a pre-defined or operator selected imaging trajectory. Hence by means of the positioner 12 radiographic projections may be acquired at various angles through the subject 22 both easily and consistently. Alternatively, in embodiments in which the X-ray source 14 and digital detector 18 are stationary, such as where the X-ray source 14 has multiple, spaced apart emission locations, no positioner 12 may be present. Alternative and hybrid configurations are possible as well. For example, in one embodiment, multiple X-ray sources 14 may be employed which move as a set (i.e., not individually). In addition, as noted above, in some embodiments, the subject 22 may be moved relative to the X-ray source(s) and/or detector to generate the radiographic projections at different views over the limited angular range.

Typically the X-ray source 14 is configured to emit X-rays useful for imaging the subject 22. In one embodiment, the X-ray source 14 is configured to emit X-rays from multiple locations, within a limited angular range, toward all or part of a subject 22 situated within an imaging volume defined by the X-ray source 14 and the detector 18. The X-ray source 14 may be movable in one, two or three dimensions to different locations, either manually or by automated means, such that the X-ray source 14 may change position relative to the subject 22, and/or the digital detector 18. In one embodiment, the angular range may be around but not limited to 80 degrees between the extreme positions of the X-ray source 14. In general, the angular range is typically less than 180 degrees between the extreme positions of the X-ray source 14.

In one embodiment, the X-ray source 14 is an X-ray tube configured to be moved to a number of locations within the angular range of the positioner 12 during imaging. Alternatively, the X-ray source 14 may include a number of stationary X-ray tubes at desired emission locations (i.e., an X-ray tube situated at each desired emission location) or a mixture of stationary and mobile X-ray tubes located at or capable of moving to the desired emission locations within the angular range.

While X-ray tubes are one possibility for X-ray generation by the X-ray source 14, in other embodiments the X-ray source 14 may employ other X-ray generation and emission techniques. For example, the X-ray source 14 may employ a solid-state X-ray emitter in place of the X-ray tube in the implementations described above, i.e., one or more mobile or stationary solid-state emitters. However, while X-ray tubes and solid-state X-ray emitters are two examples of X-ray generation and emission techniques which may be employed, other X-ray generation techniques or devices capable of generating X-rays may also be employed in conjunction with the present techniques.

The X-ray source 14, as described above, emits X-ray radiation 24 through the subject 22 towards the digital detector 18. The operation of the X-ray source 14 may be controlled by a system controller 26. For example, in one embodiment, the system controller 26 controls the activation and operation, including collimation and timing, of the X-ray source 14 via X-ray controller 30.

The system controller may also control the motion of the X-ray source 14 and/or the digital detector 18, such as via a motor controller 32. For example, the motor controller 32 may move the X-ray source 14 and/or the digital detector 18 independently of one another or in synchrony with one another, depending on the configuration of the tomosynthesis system 10 and/or the examination protocols employed. For example, in one embodiment, the motor controller 32 may control the motion and operation of the positioner 12, such as a C-arm or pivot arm, to which the X-ray source 14 and/or digital detector 18 are physically attached.

The system controller 26 may also control the operation and readout of the digital detector 18, such as through detector acquisition circuitry 34. The digital detector 18 typically includes an array of detector elements configured to generate signals in response to the X-ray radiation 24. The digital detector 18 may also include signal processing circuitry for initially processing the signals generated by the digital detector 18. For example, such circuitry may digitize analog electrical signals initially generated by the detector 18, may compensate for or remove signals acquired from bad pixels, or may otherwise normalize or prepare the generated signals for subsequent downstream processing. As discussed herein, these responsive signals may be processed to generate images of the internal structures and composition of the subject 22. In one embodiment, the digital detector 18 converts analog signals acquired in response to the X-ray radiation to digital signals and provides the same to detector acquisition circuitry 34 for further processing.

Processing circuitry 36 is typically present to process and reconstruct the data read out from the digital detector 18 by the detector acquisition circuitry 34. In particular, projection data or projection images are typically generated by the detector acquisition circuitry 34 in response to the X-rays emitted by the X-ray source 14. The projection data collected by the detector 18 may undergo pre-processing (including, for example, pixel dependent gain correction, correction for bad pixels, etc.) at the detector acquisition circuitry 34 and/or the processing circuitry 36. In addition, the processing circuitry 36 may reconstruct the projection data in accordance with the present techniques to generate one or more constrained or unconstrained quantitative three-dimensional images for display. As discussed below, in an exemplary embodiment, three-dimensional tomosynthesis material composition images, which represent different material or tissue types, are generated by the processing circuitry 36. The processing circuitry 36 may also include memory circuitry to store the processed and unprocessed data. The memory circuitry may also store processing parameters, and/or computer programs, such as routines or algorithms used in implementing the present technique.

The processing circuitry 36 may be connected to an operator workstation 40. The processing circuitry 36 may be configured to receive commands or processing parameters from the operator workstation 40 that relate to the processing of images or image data. To this end, the operator workstation 40 may include input devices such as a keyboard, a mouse, and other user interaction devices. The operator workstation 40 may also be connected to the system controller 26 to allow an operator to initiate, configure, and/or otherwise control the operation of the tomosynthesis system 10 via the system controller 26.

The operator workstation 40 is typically connected to a display 42 and/or to a printer 44 capable of rendering the tomosynthesis images generated by the processing circuitry 36. Display and/or printer circuitry within the operator workstation 40 typically provides the tomosynthesis images to the respective display 42 or printer 44 for rendering. Further the operator workstation 40 may also be connected to a picture archiving system (PACS) 46, which may in turn be connected to a remote workstation 48 through networks so that people at different locations may gain access to the tomosynthesis images and/or image data. Similarly, the operator workstation 40 may access images or data accessible via the PACS 46 for processing by the processing circuitry 36 and/or rendition on the display 42 or printer 44.

Figure 2:
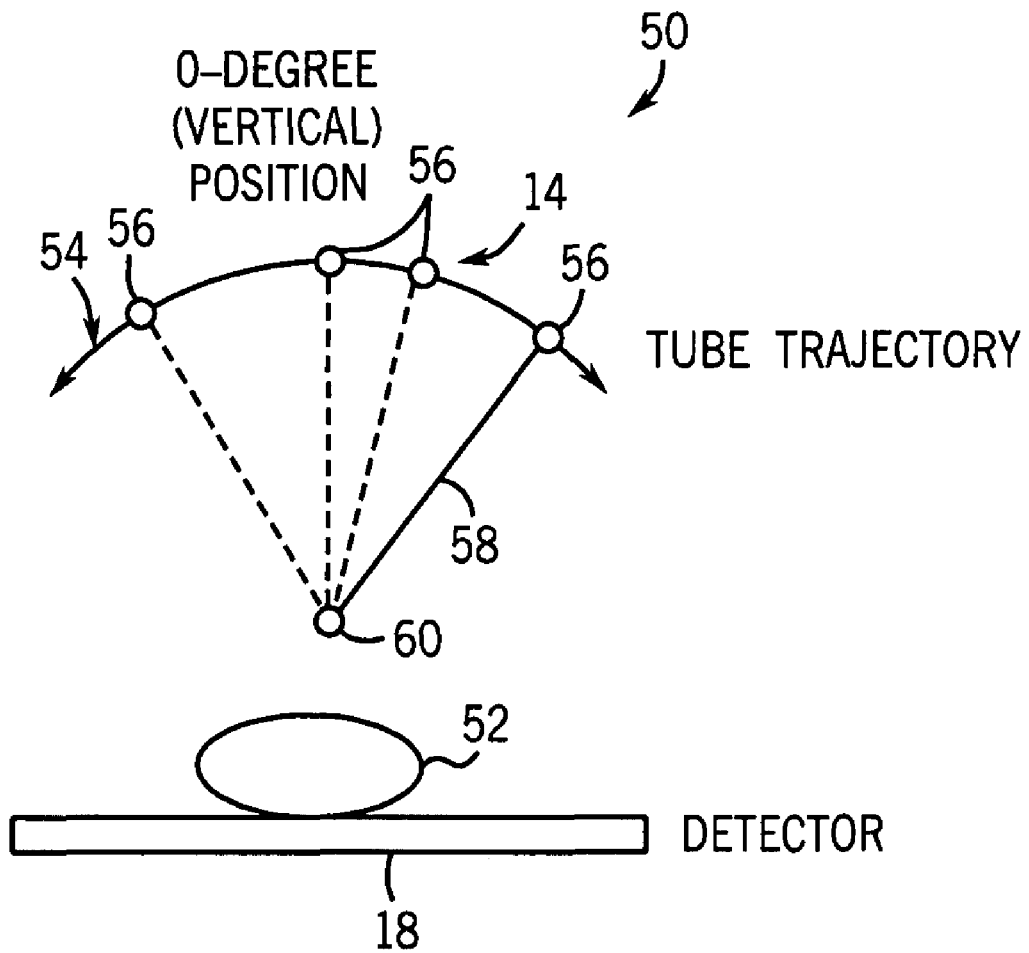
FIG. 2 depicts an exemplary mammography tomosynthesis image acquisition configuration, in accordance with the aspects of present technique.

Keeping in mind the system of FIG. 1, FIG. 2 illustrates an exemplary implementation of a tomosynthesis imaging system suitable for mammographic imaging. As shown in FIG. 2, a mammography tomosynthesis scanner 50 generally permits interposition of a subject 22 or a part of the subject, such as a breast 52 between the source 14 and detector 18. The detector 18 may vary in size and configuration while still being suitable for use in conjunction with the present technique. Although the breast 52 is depicted in FIG. 2 as generally uncompressed, i.e., not compressed into a generally uniform thickness, in some embodiments the breast 52 is compressed, such as using compression paddles or plates, to a generally uniform thickness above the detector 18.

The X-ray source 14 is illustrated as being movable along a generally curved imaging trajectory 54. The X-ray source 14 may be positioned at different locations on the imaging trajectory 54, such as those illustrated as exemplary view positions 56, for generating one or a series of projections. In one embodiment, the imaging trajectory 54 may represent the range of motion available to an X-ray source 14, such as an X-ray tube, attached to a gantry arm 58 that rotates around a pivot point 60 to acquire projections from different views positions 56. Though the imaging trajectory 54 is depicted as two-dimensional in the diagrammatic illustration of FIG. 2, those of ordinary skill in the art will appreciate that the imaging trajectory 54 may actually provide for motion in three-dimensions, i.e., the possible imaging trajectories 54 may be represented as one or more three-dimensional surfaces as opposed to being limited to two-dimensional curves or lines. Likewise, in certain embodiments, two-dimensional or three-dimensional imaging trajectories 54 may encompass the motion of multiple emitters of the X-ray source 14, such as multiple X-ray tubes or emitters of a solid state X-ray source, which may or may not be independently movable.

In typical operation, X-ray source 14 projects an X-ray beam from its focal point toward detector 18. A portion of the beam that traverses the subject, such as the breast 52 in the depicted embodiment, results in attenuated X-rays which impact detector 18. This radiation is thus attenuated or absorbed by the internal features of the subject, such as internal anatomies in the case of medical imaging.

In an exemplary embodiment, the detector 18 is formed by a plurality of detector elements. Electronics and readout circuitry is used to read charge information associated with each detector element that corresponds to the intensity of the X-ray radiation at each respective detector element. In such an embodiment, each detector element produces an analog signal representative of the incident radiation on the respective detector element. The analog signals may be digitized for subsequent processing. In one embodiment, the detector 18 is provided as an array of 2048×2048 detector elements. Other detector configurations and resolutions are, of course, possible.

The X-ray source 14 is moved and activated (or alternative emission locations of the X-ray source 14 are sequentially activated), to produce a plurality of projections or images from the different angularly offset view positions 56. The resulting projection data is acquired and processed to generate three-dimensional representations of the breast 52, or whatever tissue or structure is interposed between the source 14 and the detector 18. In an exemplary mammography implementation, the gantry or arm 58 to which source 14 is attached has a pivot point 60 located about 22.4 cm above the detector 18. In one such exemplary embodiment, the distance from the focal point of source 14 to the pivot point 60 of the gantry or arm 58 is about 44.0 cm, i.e., the arm 58 is approximately 44.0 cm long. In this exemplary mammography embodiment, the angular range of the gantry arm 58 with respect to the pivot point 60 is from about −25 to about 25 degrees, where 0 degrees corresponds to the orientation in which the gantry arm 58 is perpendicular relative to the surface of the detector 18.

In such an exemplary system, a typical examination may involve the acquisition of eleven projection radiographs, each 5 degrees apart, to cover the full angular range of the gantry, i.e., eleven view positions 56 may be employed, each 5 degrees apart to cover the extent of the imaging trajectory 54. In other embodiments, the number of view positions 56, the angular separation of the view positions 56, and/or the extent of the imaging trajectory 54 may vary. For example, in some embodiments, the angular separation between view positions 56 may vary at different positions on the imaging trajectory 54 such that view positions 56 nearer to the center of the imaging trajectory 54 have more or less angular separation than view positions 56 closer to the end of the imaging trajectory 54. Likewise, in some embodiments, the angular displacement between view positions 56 is decreased to obtain a more detailed dataset. Regardless of variations in the imaging trajectory 54 or in the number or displacement of view positions 56 on the imaging trajectory, the set of projection radiographs acquired in this manner constitutes the tomosynthesis projection dataset.

In an exemplary mammography implementation, the tomosynthesis projection dataset will include projection images that depict two types of distinct tissues in a normal, healthy breast. In particular, the projection images will depict fatty tissue and glandular-like tissue and in addition may depict some number of calcium salts in the form of microcalcifications. The present techniques are suitable for imaging both fatty and glandular-like tissues as well as microcalcifications in the mammography context, as well as abnormal or diseased tissues, which typically exhibit the same radiographic properties as fibro-glandular tissue.

Fatty and glandular-like tissues have distinct X-ray attenuation spectra, which makes it possible to decompose a breast X-ray projection radiograph into relative amounts of fatty and glandular-like tissue at each image pixel. Such a decomposition may be performed using additional information, such as calibration data, compressed breast thickness, and/or X-ray technique. Cancerous lesions consist of tissue that has attenuation properties that are similar to normal glandular tissue and can therefore be accommodated with a two-tissue approach as discussed herein, i.e., cancerous lesions will appear glandular-like. Microcalcifications, however, may be treated as an exception to the two tissue composition assumption otherwise employed. In particular, microcalcifications consist of highly attenuating material (calcium salts) with very different radiographic properties than either fatty or glandular tissue. However, because microcalcifications are typically very small (i.e., they typically cover only a few pixels in a projection image), their impact on quantitative imaging as described herein is limited. Further, exemplary techniques are provided to detect and compensate for local "outliers" caused by microcalcifications.

In a two-dimensional context, the result of a decomposition of a projection radiograph image into its fatty and glandular-like components is a new image or set of images for each X-ray projection radiograph where, for example, the percent glandular tissue and the associated height of the tissue are captured in the result. Examples of such a technique are provided in U.S. Pat. No. 6,632,020, titled "Method and apparatus for calibrating an imaging system" and U.S. Pat. No. 6,674,835, titled "Methods and apparatus for estimating a material composition of an imaged object", both of which are incorporated herein by reference in their entirety. Generating quantitative projection images, for example % composition images, may also include processing for scatter correction, thickness compensation, etc. as described further below.

While the quantitative images produced in such a decomposition process are useful in themselves, additional information may also be provided as a result of the quantitative imaging process that might otherwise be unavailable. For example, based on the resulting quantitative image data, or as the result of an additional processing step, e.g., acting on the projection images, an indicator image for the compressed breast region may be generated that indicates the region of compression, i.e., where the compressed breast is in contact with both the detector cover and a compression paddle. Likewise, an indication of the breast edge may be provided that indicates the contour defined by the skinline of the breast, i.e., the boundary of the region of the projection radiograph where the X-ray beam passes through some amount of tissue. Further summary composition statistics may be provided for the one or more X-ray radiographs. Such composition summary statistics may include useful global information about the breast, such as overall breast tissue composition, and may also include statistics that describe the distribution of tissues or materials within the imaged breast, i.e., they may describe the spatial distribution of fibro-glandular tissue. As will be appreciated by those of ordinary skill in the art, the generation of three-dimensional quantitative images from a tomosynthesis projection dataset also generally takes into account the changes in system geometry from view to view, i.e., in three-dimensional image processing, the system geometry employed for data acquisition is also considered.

As noted above, in accordance with one implementation of the present technique, a two-tissue approach may be employed in instances where this approach is consistent with the expected physiological situation, such as in mammography. In this way, prior knowledge about the underlying anatomy and its X-ray properties can be used to arrive at an essentially binary reconstruction which quantitatively reflects the actual breast tissue composition. As will be appreciated by those of ordinary skill in the art, in other implementations, both medical and non-medical, more than two types of materials may be accommodated based on the underlying physical properties, particularly the X-ray attenuation properties, of the material being imaged. For example, certain types of tissue or structures may be composed of three or four materials having distinct and separable X-ray attenuation properties. In such instances, essentially trinary or quaternary reconstructions that quantitatively reflect the composition of the tissue or structure may be appropriate. Likewise, in other implementations, the quantitative reconstruction may be scaled or represented appropriately to accommodate the number of constituent materials forming the tissue or structure undergoing imaging.

Figure 3:
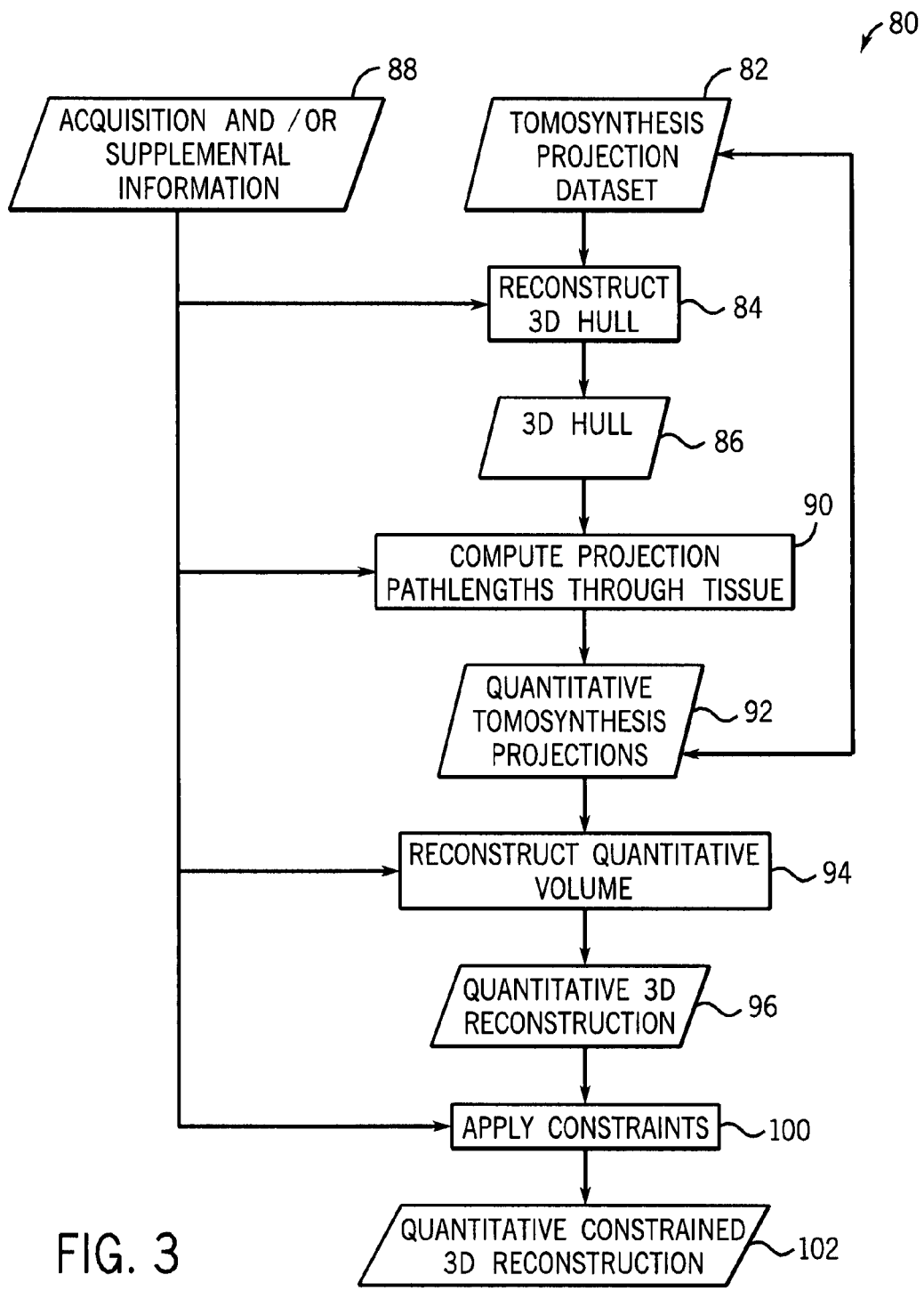
FIG. 3 is a flowchart depicting processing to generate a quantitative volume, in accordance with one aspect of present technique.

A general method 80 for reconstructing quantitative composition estimates of a three-dimensional volume is shown in FIG. 3. In accordance with this method 80, a tomosynthesis projection dataset 82 is provided that includes of a set of projection radiographs of an object or subject (such as breast 52) from different projection angles (such as view locations 56). In one embodiment, the projection radiographs in the tomosynthesis projection dataset 82 are provided after processing for scatter reduction and/or to correct for the imaging physics and/or the acquisition electronics. In one exemplary mammography implementation, the images are normalized such that for each pixel the average attenuation along the path of the corresponding ray is indicated, with reference to an assumed object of a fixed thickness, corresponding to the compressed breast thickness.

In some embodiments, additional or supplemental information 88 is also provided as an input to the method 80 for possible use in subsequent steps. For example, in mammography implementations, compressed breast thickness may be provided. Likewise, in such a mammography implementation, an indicator of the projected edge of the imaged breast, and/or an indicator for the compressed breast region may be provided as a supplemental input 88. Likewise, a global breast tissue composition metric for at least one of the images in the tomosynthesis projection dataset 82 may be provided, as well as other summary statistics, in such an exemplary mammography embodiment. This type of additional input may be generated from the tomosynthesis projections using methods known in the art. Furthermore, additional information about the breast shape may be available through some other sensor. For instance, a camera may provide information about the shape of the breast in the noncompressed breast region. This information may also be treated as an additional input 88.

An estimate of the geometry of the three-dimensional volume is generated (block 84) from the tomosynthesis projection dataset 82. This estimate, referred to as a three-dimensional (3D) hull 86, is a description of the physical object shape and location in three-dimensions. Conceptually, the 3D hull 86 is an air/tissue reconstruction of the imaged volume, $AT(x,y,z)$, where AT is "1" where $(x,y,z)$ describe a point inside the 3D hull 86 (i.e., the tissue in a mammography or other medical implementations) and "0" where $(x,y,z)$ describe a point "outside" the 3D hull 86 (i.e., air or other non-tissue). The 3D hull 86, or air/tissue reconstruction, $AT(x,y,z)$, in a medical context is, therefore, a three-dimensional mask for the object being imaged that describes the interior and the exterior of the object. Note that other methods (e.g., a surface model) or representations may be used to define the 3D hull 86.

Reconstruction of the 3D hull 86 may be accomplished, for example, by performing a preliminary 3D reconstruction of the tomosynthesis projection dataset 82 in conjunction with a binary quantization, such as an air/tissue quantization in a medical context. In such a medical context, methods which incorporate information 88 about the detected skinline in at least one of the images in the tomosynthesis projection dataset 82 may be used for such a purpose. Likewise, smoothness constraints for the skinline may be incorporated into the reconstruction of the 3D hull 86. If available, additional information 88 about the shape of the imaged object, which may be available from some other sensor such as a camera, may also be used to constrain the 3D hull 86.

In another embodiment, a preprocessing step may be applied to the tomosynthesis projection dataset 82 to compensate for different thicknesses of the object undergoing imaging. For example, such a preprocessing step may be employed in a mammographic implementation to compensate for the effect of reduced tissue thickness near the skinline. Such a preprocessing step may be referred to as thickness compensation and may be desirable in a context such as mammography where the 2D projection images may be "padded" to simulate consistent thickness by "adding" fatty tissue at the regions of reduced thickness so as to achieve the full compressed thickness. Obviously in other contexts similar techniques may be employed to achieve substantially uniform thickness of the object undergoing imaging. In such an embodiment, the reconstruction of the 3D hull 86 may be omitted and a quantitative reconstruction based on these preprocessed images may be performed to generate composition or tissue estimates at any location within the volume of the imaged object, such as the breast in mammography. Therefore, in some embodiments, reconstruction of a 3D hull 86, or substitute construct, is not required or is not required prior to subsequent processing. For example, in one embodiment, the reconstruction of the 3D hull and the corresponding interior structures are performed simultaneously in a single processing step.

Returning now to the depicted embodiment of FIG. 3, from the 3D hull 86, such as an air/tissue reconstruction, one can compute (block 90) the X-ray pathlengths for each projection radiograph in the tomosynthesis projection dataset 82. From these pathlengths and the tomosynthesis projection dataset 82 an estimate of the % composition for one or more materials (such as % glandular breast tissue in mammography implementations) can be computed for each projection radiograph. For example, in one embodiment, the tomosynthesis projection dataset 82 may be converted into a quantitative projection dataset 92 using previously acquired calibration curves to estimate for each pixel in each projection radiograph the relative amounts of different materials composing that pixel. The resulting images are called quantitative % composition projection estimates, $q_i(x,y)$. That is, the quantitative % composition projection estimates are no longer simply intensities, but rather measured amounts of one or more materials corresponding to an X-ray incident on a pixel. From these quantitative % composition projection estimates, a summary statistic for the overall % composition for each tissue of interest can be computed for a plurality of X-ray projection radiographs. For example, in a mammography implementation, quantitative % glandular projection estimates are obtained by computing the projection ray pathlength through the breast tissue for each pixel in each projection image and determining the quantitative % glandular estimate using appropriate calibration curves for the corresponding tissue thickness. In this manner the relative amounts of glandular-like tissue for each pixel of each projection radiograph can be estimated. A summary statistic for overall % glandular tissue can be computed for the X-ray projection radiographs that constitute the tomosynthesis projection dataset 82.

In an embodiment in which the 3D hull 86 is not computed first, assumptions about the shape of the object undergoing imaging may instead be employed. For example, in a mammography implementation of such a technique, assumptions about the shape of the breast in the non-compressed region (e.g., a model of the thickness as a function of the distance from the skinline and the compressed region, as well as the compressed thickness) are used to generate the % glandular estimate images directly. Therefore, a 3D breast hull is not required for the generation of the quantitative % glandular estimates in such an embodiment. In yet another embodiment, the input images of the tomosynthesis projection dataset 82 are normalized such that for each pixel the average attenuation along the path of the corresponding ray is indicated, with reference to an assumed object of a fixed thickness. The normalized projection images may be provided directly as inputs for the reconstruction step used to generate the quantitative tomosynthesis projections 92.

Using the set of quantitative % composition projection estimates 92, a reconstruction algorithm can be used (block 94) to estimate the intensities in the 3D hull 86, i.e., the 3D volume defined by AT(x,y,z). That is, the reconstructed volume takes on nonzero values where AT(x,y,z) is "1". This reconstructed volume is the quantitative reconstruction 96 in the 3D hull 86. For example, in a mammography implementation, the breast 52 is quantitatively reconstructed in the corresponding breast hull. In such an embodiment, the reconstruction of the 3D dataset can be constrained to the interior of the 3D hull 86.

In one embodiment, the reconstruction method employed at step 94 consists of applying a known reconstruction algorithm for tomosynthesis to the quantitative tomosynthesis projection dataset 92. This reconstruction algorithm could be an algorithm which receives a tomosynthesis projection dataset (i.e., two-dimensional projection images) as an input and, as an output, reconstructs a three-dimensional volumetric image of the object which produced the projection images.

Some reconstruction techniques, such as filtered backprojection, may include a preprocessing step (e.g., a filtering) before the three-dimensional quantitative reconstruction 96 is formed. Such a preprocessing step may violate or otherwise be inconsistent with some constraints on the quantitative projection images (such as the quantitative % glandular estimates in mammography). Therefore, in embodiments employing such reconstruction techniques, it may be useful to correct for this type of inconsistency before performing the final reconstruction step. For example, in an embodiment employing a filtered backprojection reconstruction method, an image is first high-pass filtered, and then backprojected. Such a filtering step can potentially introduce impermissibly high or low values (such as greater than 100% glandular or less than 100% fat). In these embodiments, such outliers may be rounded to the nearest admissible value to improve the reconstruction performed at step 94.

In embodiments where a 3D hull 86 is not generated prior to generation of the quantitative 3D reconstruction 96, such a 3D hull 86 may be simultaneously generated with the quantitative 3D reconstruction 96. For example, in a mammography implementation, the reconstruction step 94 may be used to simultaneously reconstruct the interior structures of the breast as well as the breast hull (i.e., its three-dimensional shape and location). In such an embodiment, additional information 88, like the projected skinline as detected in the tomosynthesis projection dataset 82, can be used in the reconstruction process 94, such as in conjunction with smoothness constraints and other constraints. This simultaneous reconstruction of the geometry and the three-dimensional interior structure may be suitable for use with an iterative update process, as described below, where at each step the skinline geometry as well as the reconstruction of the breast is improved.

The quantitative 3D reconstruction 96 in the corresponding 3D hull 86 may include numerical intensity values between the intensity values that correspond to the different materials forming the imaged object. Such intermediate intensity values may be attributable to voxels that represent locations where there are mixtures of the different materials. For example, in a mammography example, the quantitative reconstruction 96 of the breast in the breast hull may include numerical intensity values between the intensity values that correspond to fatty tissue or glandular tissue. Such intermediate intensity values may be indicative of voxel locations within the breast hull where the composition is mixed between fatty and glandular tissue. This type of effect may be known as a partial volume effect.

However, the structure or anatomy is distinct. That is, ignoring partial volume effects, at any given (x,y,z) coordinate, a location in the imaged object corresponds to one type of material. For example, in the mammography example, at any given (x,y,z) coordinate, the tissue is either fat or glandular-like tissue. In some embodiments, the quantitative reconstruction 96 may be constrained by the application of one or more constraining rules or factors to remove or reduce such mixed compositions. Similarly, mixed compositions consisting of air/fatty tissue (or other combinations) may be removed or reduced by using appropriate constraints. For example, in one embodiment, the constraint set may take the form of a plurality of models that constrain the anatomical morphology, intensities, and/or summary statistics of the quantitative reconstruction 102.

For example, in one embodiment, a binary voxel constraint can be applied (block 100) to the quantitative reconstruction 96, Q(x,y,z) to yield a quantitative constrained 3D reconstruction 102, such as a binary reconstruction. In such an embodiment, the constraint set may map the continuous voxel intensities in the quantitative reconstruction 96 to intensities of a constrained (such as binary) quantitative reconstructed volume 102. In a mammography implementation of this embodiment, the reconstruction at any voxel would be either fatty or glandular tissue, i.e., a binary reconstruction labeled, "1" for fatty tissue or "2" for glandular tissue at every voxel in the constrained reconstruction 102. In such a constrained implementation, no voxels will have an intermediate intensity that does not correspond to a particular material, i.e., no voxels will have an intensity representative of a mixture of the different materials.

In one such binary constrained implementation, constraint sets may include quantization of the voxel intensities in the quantitative 3D reconstruction 96 using a threshold. In such an embodiment, a threshold may be chosen in various ways, including computing a threshold from first principles imaging physics, such as based on attenuation coefficients and so forth. For example, in one implementation one may choose a threshold that lies halfway between the target quantization values, i.e., for an intensity value, x, between the expected intensities for each of the "fat" and "glandular" tissues, one might set the voxel to "fat" if x is less than ½ ("fat"+"glandular"), and to "glandular" otherwise.

Such a binary threshold may be computed in other ways as well. For example, one or more summary statistics may be computed from at least one projection image and the summary statistics may be used to determine the threshold. For example, a threshold may be selected that corresponds to the same summary statistic for the volume. The summary statistic could be any metric, in general. Such metrics include, but are not limited to: the percent glandular summary statistic or the gray level integral in the log domain. For example, in a mammography implementation, if the global composition of an imaged breast is determined to be 40% glandular, then the threshold for quantization is chosen such that 40% of the candidate voxels are quantized as glandular, i.e., assigned an intensity value corresponding to glandular tissue. In such an implementation, the threshold value may be determined from the histogram of voxel values in the non-quantized reconstruction. Using more than one constraint of a similar nature may allow for accurate adjustment of several quantization thresholds, i.e., a threshold discriminating between air and fatty tissue and/or a threshold discriminating between fatty tissue and glandular tissue. Furthermore, in an exemplary embodiment, the reconstructed quantitative 3D volume Q(x, y,z) is re-projected at some or all acquisition angles and a threshold is chosen that best matches the summary statistics between the original tomosynthesis projection dataset and the reconstruction re-projections.

Other constraints may be implemented such that the quantitative 3D reconstruction 96 may be constrained in its volumetric extent to the volume defined by the 3D hull 86. This constraint may be an integral part of reconstruction step 94, or it may be applied as a separate constraint, such as at step 100. The quantitative 3D reconstruction 96 may also be quantized in such a way that it produces a quantitative constrained 3D reconstruction 102. The specific form of the constraint set that produces such a quantitative 3D constrained reconstruction 102 may include any information or processing that injects additional information in the process of reconstruction from projections.

Other types of constraints may also be employed at step 100. For example, morphological constraints, such as constraints controlling the size and shape of connected regions of glandular voxels, may also be applied. Such morphological constraints may constrain the three-dimensional structures in the reconstruction to more closely resemble the anatomical properties of a real breast. These constraints may include, but are not limited to, relabeling (for an intermediate quantized constrained quantitative 3D reconstruction 102) or adjusting voxel intensities (for a non-quantized quantitative 3D reconstruction 96) in regions where isolated voxels or small groups of voxels differ from their background volumes. For example, one would not expect to observe a single isolated voxel of glandular tissue contained within a larger volume that is otherwise composed entirely of fatty tissue. In one implementation, such a single, isolated voxel would be relabeled or have its intensity adjusted to correspond to its environment. Other similar constraints based on similar principles of using anatomical prior knowledge to allow or disallow certain reconstructions are also possible. As will be appreciated, some reconstruction threshold choices or relabeling choices may result in depicted structures that are too large or too small. These structures may be altered in intensity, size and/or shape characteristics by standard volume processing techniques to address such issues.

While the preceding describes possible constraints on the quantitative 3D reconstruction, in some embodiments, no constraints are applied. That is, the quantitative 3D reconstruction 96 may be the same as the quantitative constrained 3D reconstruction 102. Further, where the process is iterated, the number and type of constraints may vary between iterations such that no constraints are applied during some iterations while multiple or different constraints may be applied during other iterations. For example, some constraints may be more useful than others at specific points in the quantitative reconstruction process.

Further, to facilitate discussion and explanation, the methodology described herein of enforcing the constraints consists of modifying a first, intermediate reconstruction (such as quantitative 3D reconstruction 96) that was previously computed without being subject to the set of constraints. However, instead of being applied as a separate or subsequent step, the constraints can also be built directly into the reconstruction step 94 in certain embodiments. In addition, in another embodiment a quantitative tomosynthesis projection dataset 92 may not be provided as an input for the reconstruction step 94. In such an embodiment, it may be sufficient to have a good estimate of the corresponding relative linear attenuation coefficients of the different tissue types as a "constraint set".

The preceding describes different constraint approaches, some or all of which may be applied in forming a quantitative constrained 3D reconstruction 102. In view of the various constraint approaches that may be applied, the quantitative constrained 3D reconstruction 102 can take on a number of different forms depending on the particular constraint set applied to the quantitative 3D reconstruction 96 that produced it. For example, in one implementation, each voxel of the quantitative constrained 3D reconstruction 102 can be assigned a label based on thresholds chosen in the constraint set. In one such implementation applying air, fat, and glandular labels, the form of the constrained reconstruction 102 may be an indexed set of three labels. If the volume is already constrained to the 3D hull 86, the form of the constrained reconstruction 102 may be an indexed set of only two values, fat and glandular. If microcalcifications are included in the constrained reconstruction, there may be two, three, or four labels. For instance, in one labeling scheme, if the constrained reconstruction 102 is already constrained to exist in only the 3D hull 86, the form of the constrained reconstruction 102 may be labels for only soft tissue (fat or glandular) and microcalcifications. Likewise, in an alternative embodiment, the specific soft tissue distinctions may be distinguished within the 3D hull 86 such that the labels are fat, glandular, and microcalcification. The most general label scheme would use all labels. For instance, the air, fat, glandular and microcalcification labels could be used in a single constrained reconstruction 102. As will be appreciated, the "labels" may be textual or numeric in nature. Indeed, any visual or other labeling scheme may be employed that allows the constituent components of the imaged volume to be distinguished in the constrained reconstruction 102. For example, one can use the linear attenuation coefficients associated with the different tissue types for some fixed X-ray spectrum as labels.

The constrained reconstruction 102 may also be a numerical mapping from the quantitative 3D reconstruction 96 that produces a "fuzzy" numerical label associated with each tissue type. Such a "fuzzy" labeling approach allows intermediate tissue labeling in the constrained reconstruction 102, which can provide for partial volume effects. In such a mapping, instead of forcing each voxel to take on one of a set of specific labels (or numerical values) associated with particular tissues, this constraint is relaxed and the constrained reconstruction 102 provides for voxel intensity values which are allowed to approach the numerical labels based on image properties. In this manner, the voxel intensities in the quantitative 3D reconstruction 96 are remapped to a scale related to two or more defined labels as described above, but are actually another set of intensities. In this way, the constrained reconstruction 102 is not a set of discrete labels, but rather a continuous-valued set of intensity values. For example, in one embodiment, the sets of intervals $\{[air, air+\Delta_a], [fat-\Delta_f, fat+\Delta_f], [glandular-\Delta_g, glandular+\Delta_g], [calc-\Delta_c, calc+\Delta_c]\}$, are the allowable intensity values in the constrained reconstruction 102. A value in the quantitative 3D reconstruction 96 that lies between "fat+$\Delta_f$" and "glandular-$\Delta_g$" is rounded to some value either between "fat" and "fat+$\Delta_f$" or between "glandular" and "glandular-$\Delta_g$", depending on the constraint set. A different value in the quantitative 3D reconstruction 96 that lies between "fat-$\Delta_f$" and "fat+$\Delta_f$" might remain unchanged, depending on the constraint set. As will be appreciated, mappings need not specifically map a numerical intensity value in the quantitative 3D reconstruction 96 to a label in the constrained reconstruction 102, but may be more broadly described as the result of applying the constraint set to the quantitative 3D reconstruction 96.

As noted above, in an implementation of the present technique based on a two-tissue model, there may be exceptions to the two tissue model that can be separately processed. For example, in a mammography implementation, microcalcifications represent exceptions to the two-tissue composition model which may be processed separately. In such an implementation, known image processing techniques to detect microcalcifications in the tomosynthesis projection dataset 82 and/or the quantitative projection image dataset 92 may be used. Once the microcalcifications are detected, they can be excluded from the reconstruction procedure 94 and a subsequent quantization, if performed. In such an implementation the calcifications may instead be reconstructed separately to generate three-dimensional calcification information that can be inserted into the constrained reconstruction 102 to recover a full quantitative reconstruction of the imaged breast.

Figure 4:
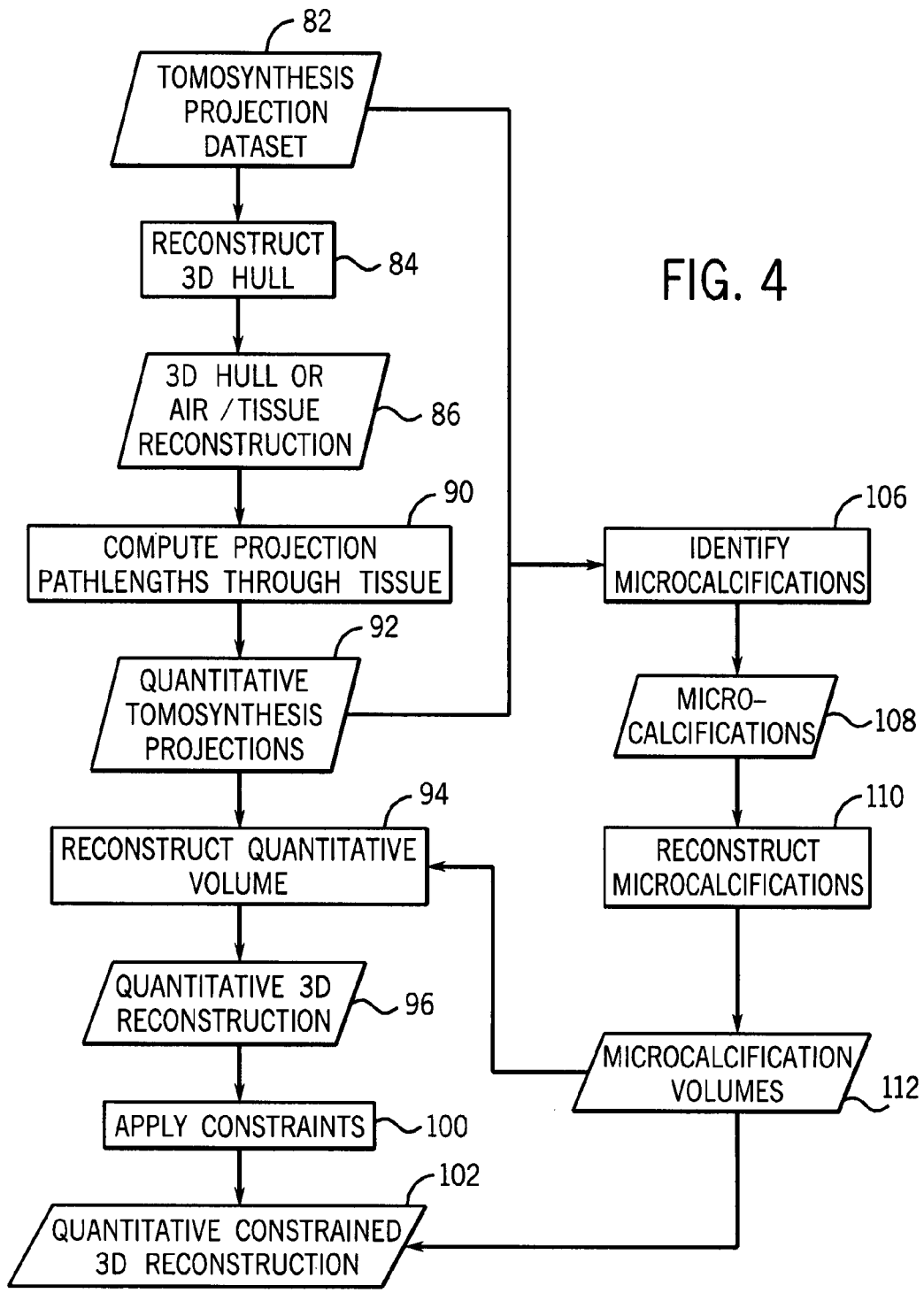
FIG. 4 is a flowchart depicting processing to generate a quantitative volume, in accordance with a further aspect of present technique.

For example, turning now to FIG. 4, in a depicted mammography implementation, microcalcifications 108 are identified (block 106) in each image of the tomosynthesis projection dataset 82 and/or the quantitative tomosynthesis projections 92. Once identified, the portions of the tomosynthesis projection dataset and/or the quantitative tomosynthesis projections 92 corresponding to the microcalcifications 108 may be reconstructed (block 110) to generate a 3D reconstruction of the microcalcifications contained in the breast, i.e., a microcalcification volume 112. In one such implementation, the microcalcification volume 112 has essentially a zero mean background and signal only at the locations of the microcalcifications 108.

In one embodiment, a determination is made whether the volumetric microcalcifications present in microcalcification volume 112 are manifested in the projection data, i.e., the tomosynthesis projection dataset 82 and/or the quantitative tomosynthesis projections 92. Such a determination may be made by re-projecting the microcalcification volume 112. Based on this determination, a quantitative 3D reconstruction 96 free of microcalcifications may be computed. For example, in one embodiment, the quantitative 3D reconstruction 96 at a location (x0, y0, z0) is reconstructed using only a subset of the pixel values in the quantitative projection radiographs 92 that contain no microcalcifications. That is, in the reconstruction process 94, pixel values in the projection radiographs that contain microcalcifications at the (x1, y1) pixel locations that map to the (x0, y0, z0) location being reconstructed are discarded.

In an alternative implementation, a quantitative 3D reconstruction 96 free of microcalcifications 108 is generated by replacing values in the quantitative projection radiographs 92 corresponding to locations that coincide with the projected location of a microcalcification 108 with "calcification-free" estimates based on neighboring pixel values. The resulting adjusted quantitative tomosynthesis projections 92 may then be reconstructed (block 94), as described herein, to generate the quantitative 3D reconstruction 96 in this implementation.

In yet another embodiment, the size and X-ray attenuation characteristics of the reconstructed 3D calcifications observed in the microcalcification volume 112 are used to correct the corresponding pixel values in the quantitative projection radiographs 92. For example, the estimated contribution of the microcalcifications 108 to the projections of the tomosynthesis projection dataset 82 and/or the quantitative tomosynthesis projections may be removed or otherwise accounted for based on the imaging physics of the imaging system. The resulting corrected projections are used as inputs for the quantitative reconstruction at step 94, thereby generating a quantitative 3D reconstruction free of microcalcifications.

In embodiments where the quantitative 3D reconstruction 96 is generated free of microcalcifications 108, as described above, the quantitative 3D reconstruction 96 may be used to generate a constrained reconstruction 102 that is also free of microcalcifications. In certain embodiments, the microcalcification volumes 112 may be combined with the microcalcification-free constrained reconstruction 102 to preserve this aspect of the projection data. As will be appreciated by those of ordinary skill in the art, though microcalcification retention is an example of this technique as it might be applied to mammography, in other implementations this technique may be used to preserve other fine features or structural details where the feature or detail does not correspond to a primary material or tissue forming the object being imaged. Such details may, nevertheless, be of interest to a reviewer.

Figure 5:
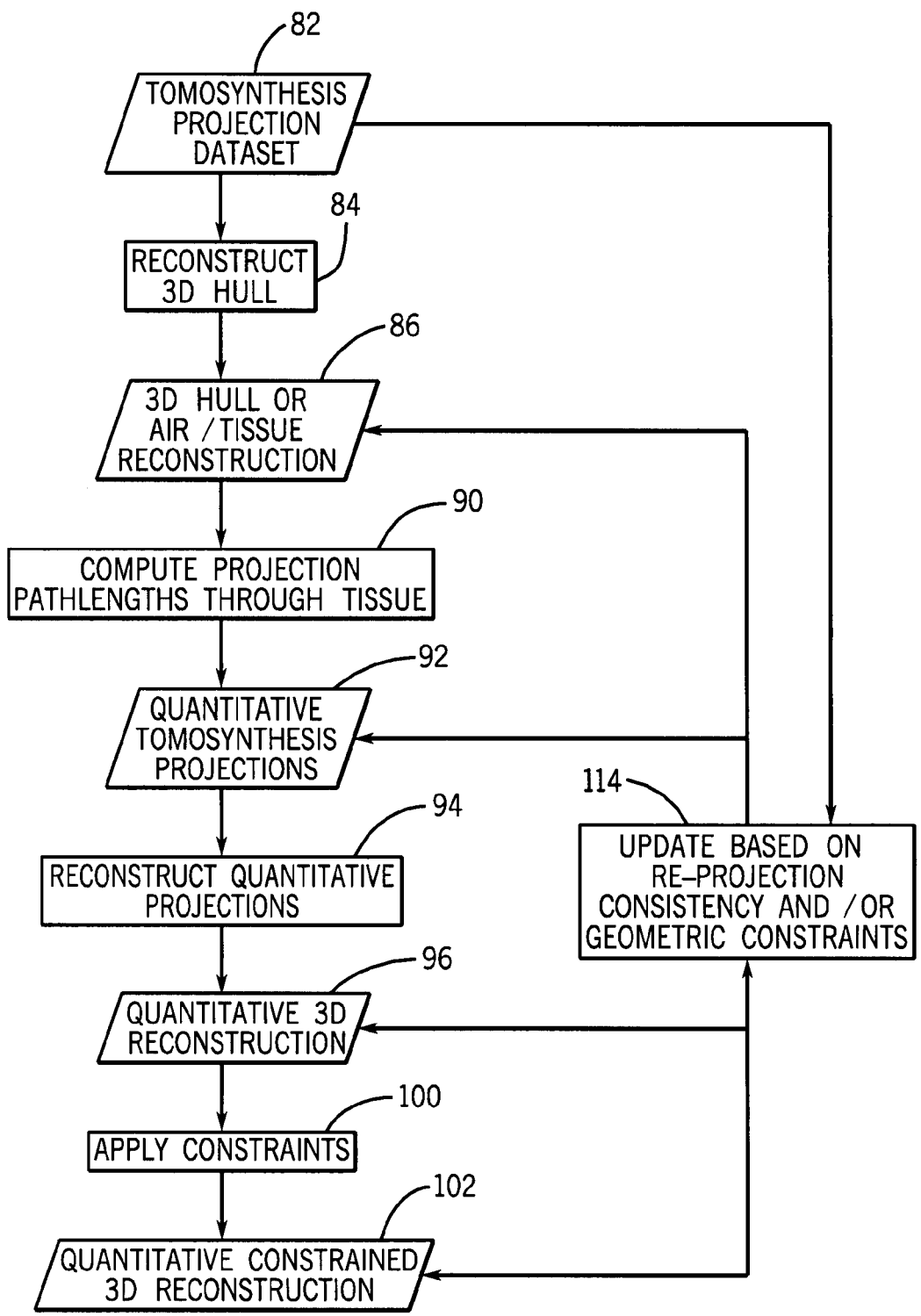
FIG. 5 is a flowchart depicting processing to generate a quantitative volume, in accordance with an additional aspect of present technique.

In one embodiment, depicted in FIG. 5, one or more of the 3D hull 86, the quantitative projections 92, the quantitative 3D reconstruction 96 and/or the constrained quantitative reconstruction 102 are updated (block 114) to enforce consistency with the original tomosynthesis projection data 82, and/or with other additional information and constraints. For example, in one embodiment, the update step 114 can be used to update the 3D hull estimate 86 and/or to update the quantitative projection data within the 3D hull. The update step 114 may be performed once or may be iteratively performed a set number of times or until some consistency criteria or threshold is satisfied.

For example, in one embodiment, the update step 114 involves re-projecting of an existing volume and comparing the re-projected images with the original projection images 82. If the re-projected images are, within some tolerance, determined to be substantially the same as the corresponding projections of the tomosynthesis projection dataset 82, i.e., if re-projection consistency is satisfied, no additional updating is performed and the constrained reconstruction may be provided to a reviewer or stored for future review. If, however, re-projection consistency is not satisfied, the existing volume is updated to reduce the deviation between original tomosynthesis projection dataset 82 and the re-projected dataset. For example, if re-projection consistency is not satisfied, adjustments may be made to the 3D hull 86, the quantitative tomosynthesis projections 92, or so forth until re-projection consistency is established.

As noted above, the update step 114 may be repeated or iterated to achieve convergence to an acceptable solution. Furthermore, such an iterative update 114 may result in an update to the 3D hull 86, the quantitative 3D reconstruction 96, and/or the constrained quantitative reconstruction 102, each separately or together. In an iterative implementation, at every iteration one or more of these updates may be performed. In one embodiment, the projection images provided as inputs to the reconstruction process, such as quantitative tomosynthesis projections 92, are updated each iteration such that the reconstruction based on the updated images is improved each iteration until a set number of iterations have been performed or until a threshold image quality or consistency is reached. For example, the scatter contribution may be recomputed based on the current reconstruction (either quantitative reconstruction or constrained reconstruction), and based on the scatter contribution a new set of quantitative projection images may be determined. The iteration may also be performed (with or without an update of the quantitative projection images), such that consistency with the quantitative projection images is reached.

In embodiments employing re-projection, the reconstructed volume may be re-projected such that the re-projected images are directly comparable to the acquired projection images of the tomosynthesis projection dataset 82. In certain embodiments, the re-projection step is general and can transform a label image, such as a constrained reconstruction 102, into a set of re-projections whose pixel intensities are continuous-valued such that they are comparable to the projection images of the tomosynthesis projection dataset 82.

With regard to embodiments in which re-projected images are compared with the acquired projection images of the tomosynthesis projection dataset 82, generation of an error or difference signal for testing a consistency constraint may be as straightforward as subtracting images in the tomosynthesis projection dataset 82 from the corresponding re-projection images on a pixel-by-pixel basis. However, other approaches to computing an error signal between a set of acquired projections and re-projections are also possible. For example, if the acquired projections are denoted as $q_i(x,y)$ and the re-projections at iteration j are denoted as $r_i(x,y)^{(j)}$ or $b_i(x,y)^{(j)}$, the error signal may be some function of the tomosynthesis projection dataset 82 (or some processed version thereof) and some or all of the re-projections at every prior and current iteration. That is, the error signal may be represented as:

$$E_j = \Psi(\Xi_0(q(x,y)), \Xi_1(r_1(x,y)), \Xi_2(r_2(x,y)), \ldots, \Xi_j(r_j(x,y), \Xi_{j+1}(b_1(x,y)), \Xi_{j+2}(b_2(x,y)), \ldots, \Xi_{2j}(b_j(x,y))))$$

where the $\Xi_i$ functions may be used to compute the error at specific regions of the projections or weight the errors at specified regions in the projection domain. This may be useful in some implementations because some regions of the re-projection images or the quantitative projection radiographs 92 may contain differences that are irrelevant to the reconstruction. As will be appreciated, in certain embodiments the error function, $\Psi$, takes as inputs two sets of geometrically mapped or registered images in the projection domain and may generate a difference of the image sets or a difference with a saturating nonlinearity or some other nonlinear operation on the image sets. In general, $\Psi$ and $\Xi_i$ are functions which may depend on local neighborhoods of pixel intensities and/or global properties of the reconstruction (i.e., the quantitative 3D reconstruction 96 and/or the constrained reconstruction 102), the acquired projections (i.e., the tomosynthesis projection dataset 82), or the re-projections. The error signal may also include or depend on differences of summary statistics, or functions thereof.

With regard to updates or modifications performed at block 114, in some embodiments computing an update or correction to a reconstruction may involve reconstructing a 3D volume corresponding to the difference between re-projected images and the original tomosynthesis projection dataset 82. In such embodiments, this correction volume may be added to or otherwise combined with a previously determined quantitative 3D reconstruction and/or constrained reconstruction 102. In certain embodiments, a weighting factor may be employed when adding or combining the correction volume and the previously determined quantitative 3D reconstruction and/or constrained reconstruction 102.

Other combinations of reconstructed volumes and correction volumes are also possible. For example, in certain embodiments one might combine the reconstructed volume from a previous iteration and the correction volume using a nonlinear transformation. Such a nonlinear transformation might include multiplicative transformations, logarithmic transformations, saturating nonlinearities, or other transformations or nonlinear look up tables. Such a nonlinear transformation may be applied to either the previous iteration reconstruction and/or the correction volume. Alternatively, the combination of the previous iteration reconstruction and the correction volume could be remapped nonlinearly. Likewise, the combination of the previous iteration reconstruction and the correction volume could include some spatial filtration such that reconstruction voxel intensities are adjusted based on local neighborhood and/or global reconstructed volume properties.

In one embodiment, the update step 114 may encompass an algebraic reconstruction technique (ART) or similar technique. Such reconstruction techniques are generally suitable for situations involving reconstruction from projection type approaches. An update step 114 utilizing such a reconstruction technique may be quite general and may encompass various alternative embodiments. In particular, such reconstruction techniques may be general in nature because appropriate quantitative constraints can be applied at some or all of the iterations and for some or all of the intermediate results.

Figure 6:
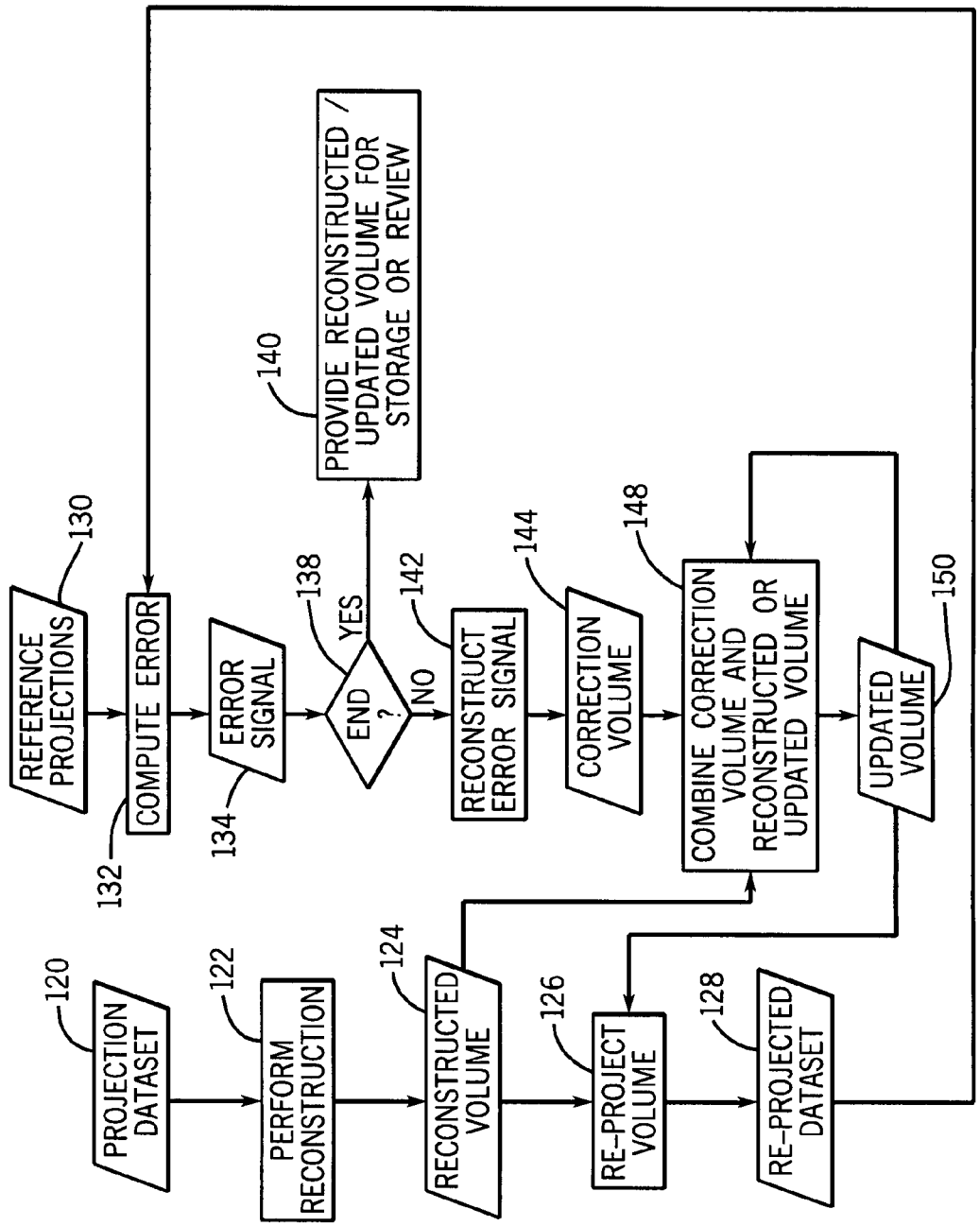
FIG. 6 is a flowchart depicting iterative processing, in accordance with one aspect of present technique.

Keeping in mind the preceding discussion of re-projection and reconstruction techniques and of the construction of correction volumes and their combination with existing volumes, one example of an update step 114 is depicted in FIG. 6. In this example, an initial reconstruction (block 122) of a projection dataset 120 is performed to generate a reconstructed volume 124. The projection dataset 120 may be, for example, the original tomosynthesis projection dataset 82 or the quantitative tomosynthesis projections 92. The reconstructed volume 124 may be a constrained or unconstrained volume, such as quantitative 3D reconstruction 96 or constrained reconstruction 102.

In this example, the reconstructed volume 124 is re-projected (block 126) to generate a dataset 128 of re-projected images corresponding to a set of reference projection images 130, such as the projections of the original tomosynthesis projection dataset 82. In the present example, an error signal 134 is computed (block 132) representing the differences between the re-projection images 128 and the reference projection images 130. In some embodiments or iterations, the projection dataset 120 and the reference projection images 130 may be the same. Further, in some embodiments, the error signal 134 may be constrained with a constraint set specific to the error computation step 132 or to a particular iteration of the error computation step 132.

If the differences between the re-projected images 128 and the reference projections 130 are determined (block 138) to be within a desired threshold, i.e., if the re-projected images 128 are sufficiently consistent with the reference projections 130, processing may be stopped and the reconstructed volume provided (block 140) to a reviewer or stored for future review. If the differences between the re-projected images 128 and the reference projections 130 are not determined (block 138) to be within the desired threshold, i.e., if the re-projected images 128 are not sufficiently consistent with the reference projections 130, the error signal 134 is reconstructed (block 142) to generate a correction volume 144. In some embodiments, the correction volume 144 may be constrained with a constraint set specific to the reconstruction step 142 or to a particular iteration of the reconstruction step 142. In the depicted embodiment, the correction volume 144 is combined (block 148) with an existing reconstruction, such as the reconstructed volume 124 to generate an updated volume 150. For example, in some embodiments, the existing reconstruction is the quantitative 3D reconstruction 96 or the constrained reconstruction 102. In some embodiments, the combination step 148 may be constrained with a constraint set specific to this combination step 148 or to a particular iteration of the combination step 148. Alternatively, in other embodiments, the stopping criterion of the iterative update may be given by some measure of image quality in the reconstruction domain, e.g., a sufficient number of voxels that correspond to one of the tissues, etc.

If, after re-projection (block 126) and generation of a respective error signal 134, the updated volume 150 is determined (block 138) to be sufficiently consistent with the reference projections 130, no additional iterations are performed and the updated volume is provided (block 140) to a reviewer or stored for future review. If the updated volume 150 is not determined (block 138) to be sufficiently consistent with the reference projections 130, the updated volume 150 is combined (block 148) with the respective correction volume 144 generated from the respective error signal representing the differences between the reference projections 130 and a re-projected dataset 128 generated from the updated volume 150. The depicted update process may be iterated until sufficient consistency is achieved, as determined at block 138, or until a set number of iterations have been performed.

While the preceding discussion relates one manner by which quantitative 3D reconstructions 96 may be generated and/or processed, other approaches are also possible. For example, one alternative approach for generating quantitative 3D reconstructions 96 encompasses the minimization of different energy functionals. The definitions of such energy functionals may include or otherwise encompass properties related to algorithms useful for estimating quantitative 3D reconstructions 96 having properties similar or identical to quantitative 3D reconstructions 96 described above. Such reconstructions, like those described herein, generally encompass 3D reconstructions of an imaged structure or tissue where the 3D reconstruction localizes different constituent material or tissue types within the 3D reconstruction using tomosynthesis or some other projection imaging technique.

Figure 7:
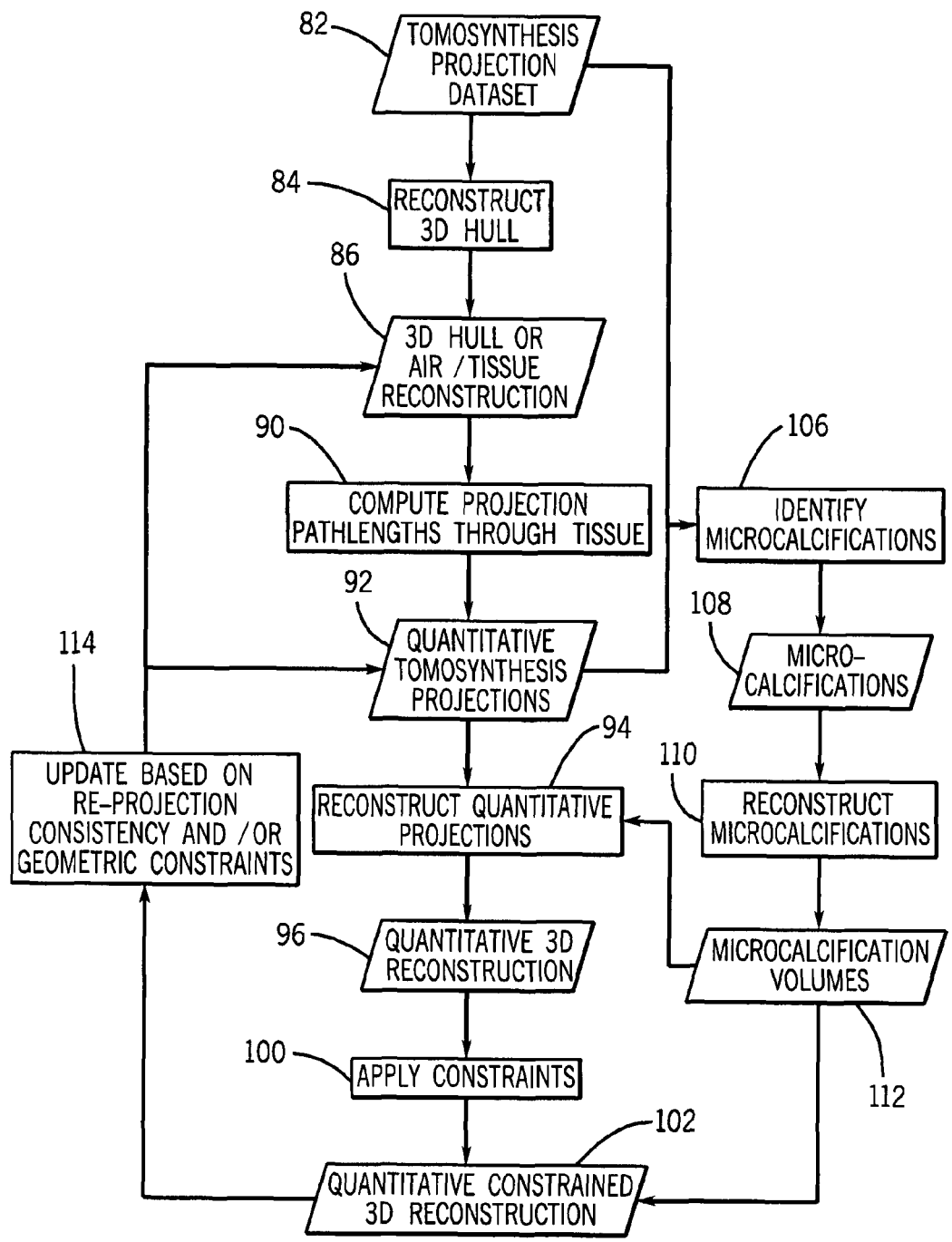
FIG. 7 is a flowchart depicting processing to generate a quantitative volume, in accordance with a further aspect of present technique.

While the preceding discussion describes certain embodiments as independent of one another for simplicity, it should be appreciated that different aspects of the present technique discussed separately herein may be performed together in practice. For example, referring now to FIG. 7, microcalcification (or other fine detail) processing, as discussed with regard to FIG. 4, may be performed in conjunction with consistency checking 114, as discussed with regard to FIGS. 5 and 6. In this manner, high quality quantitative 3D reconstructions containing fine detail may be generated.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for generating a volume, comprising:
providing a plurality of projection images;
generating a plurality of respective quantitative projection images based on the plurality of projection images, wherein the quantitative projection images comprise a plurality of pixels that each correspond to a quantitative composition estimate representing a combination of two or more materials; and
reconstructing the plurality of quantitative projection images to generate a quantitative volume comprising a plurality of voxels, wherein each voxel value corresponds quantitatively to one of the two or more materials or a mixture of the two or more materials.

2. The method of claim 1, wherein generating the plurality of respective quantitative projection images comprises converting the plurality of projection images into the plurality of respective quantitative projection images by at least one of: using at least one calibration curve to estimate the relative amounts of the two or more materials represented by each pixel in at least on of the projection images, using a look-up table to estimate the relative amounts of the two or more materials represented by each pixel in at least on of the projection images, using a functional relationship to estimate the relative amounts of the two or more materials represented by each pixel in at least on of the projection images, computing a thickness compensated image, computing a scatter corrected image, and computing a constrained projection image.

3. The method of claim 1, wherein the two or more materials comprise different tissue types.

4. The method of claim 1, wherein each of the two or more materials have distinct X-ray attenuation properties.

5. The method of claim 1, comprising reconstructing a three-dimensional hull volume from the plurality of projection images, wherein reconstructing the plurality of quantitative projection images is done with respect to the three-dimensional hull volume.

6. The method of claim 1, comprising constraining the quantitative volume to generate the constrained volume.

7. The method of claim 6, wherein constraining the quantitative volume comprises applying a binary voxel constraint such that the constrained volume comprises a binary volume.

8. The method of claim 1, comprising at least one iterative update step for at least one of a quantitative projection image, the constrained volume or the quantitative volume in view of at least one of re-projection consistency or geometric constraints.

9. The method of claim 1, comprising:
identifying one or more microcalcifications in at least one of the plurality of projection images or the plurality of quantitative projection images;
reconstructing the one or more microcalcifications to generate one or more respective microcalcification volumes; and
combining the one or more microcalcification volumes with the at least one of the quantitative volume or a constrained volume.

10. An image processing system comprising:
processing circuitry configured to generate a plurality of quantitative projection images based on a plurality of respective projection images, wherein the quantitative projection images comprise a plurality of pixels that each correspond to a quantitative composition estimate of two or more materials, and to reconstruct the plurality of quantitative projection images to generate a quantitative volume comprising a plurality of voxels, wherein each voxel value corresponds quantitatively to one of the two or more materials or a mixture of the two or more materials.

11. The image processing system of claim 10, comprising detector acquisition circuitry configured to acquire the plurality of projection images and to provide the plurality of projection images to the processing circuitry.

12. The image processing system of claim 10, comprising an operator workstation configured to display or store the quantitative volume.

13. The image processing system of claim 10, wherein the processing circuitry generates the plurality of quantitative projection images by converting the plurality of respective projection images into the plurality of quantitative projection images by one or more of: using at least one calibration curve to estimate the relative amounts of the two or more materials represented by each pixel in each projection image, using a look-up table to estimate the relative amounts of the two or more materials represented by each pixel in at least on of the projection images, using a functional relationship to estimate the relative amounts of the two or more materials represented by each pixel in at least on of the projection images, computing a thickness compensated image, computing a scatter corrected image, and computing a constrained projection image.

14. The image processing system of claim 10, wherein the processing circuitry is configured to constrain the quantitative volume to generate the constrained volume.

15. The image processing system of claim 10, wherein the processing circuitry is configured to perform at least one iterative upate step for at least one of a quantitative projection image, the constrained volume or the quantitative volume in view of at least one of re-projection consistency or geometric constraints.

16. One or more non-transitory, machine readable media encoding code which, when executed by processing circuitry, causes the processing circuitry to:

generate a plurality of respective quantitative projection images based on a plurality of projection images, wherein the quantitative projection images comprise a plurality of pixels that each correspond to a quantitative composition estimate representing a combination of two or more materials; and reconstruct the plurality of quantitative projection images to generate a quantitative volume comprising a plurality of voxels, wherein each voxel value corresponds quantitatively to one of the two or more materials or a mixture of the two or more materials.

17. The one or more non-transitory media as recited in claim 16, wherein the processing circuitry generates the plurality of respective quantitative projection images by converting the plurality of projection images into the plurality of respective quantitative projection images by at least one of: using at least one calibration curve to estimate the relative amounts of the two or more materials represented by each pixel in each projection image, using a look-up table to estimate the relative amounts of the two or more materials represented by each pixel in at least on of the projection images, using a functional relationship to estimate the relative amounts of the two or more materials represented by each pixel in at least on of the projection images, computing a thickness compensated image, computing a scatter corrected image, and computing a constrained projection image.

18. The one or more non-transitory media as recited in claim 16, wherein the media also encodes code which, when executed by the processing circuitry, causes the processing circuitry to reconstruct a three-dimensional hull volume from the plurality of projection images, wherein the processing circuitry reconstructs the plurality of quantitative projection images with respect to the three-dimensional hull volume.

19. The one or more non-transitory media as recited in claim 16, wherein the media also encodes code which, when executed by the processing circuitry, causes the processing circuitry to constrain the quantitative volume to generate the constrained volume.

20. The one or more non-transitory media as recited in claim 16, wherein the media also encodes code which, when executed by the processing circuitry, causes the processing circuitry to perform at least one iterative update step for at least one of a quantitative projection image, the constrained volume or the quantitative volume in view of at least one of re-projection consistency or geometric constraints.

* * * * *